United States Patent
Nakanishi et al.

(10) Patent No.: US 7,169,449 B2
(45) Date of Patent: Jan. 30, 2007

(54) LIQUID CRYSTAL DISPLAY DEVICE

(75) Inventors: Yohei Nakanishi, Kawasaki (JP); Masakazu Shibasaki, Kawasaki (JP); Kazutaka Hanaoka, Kawasaki (JP); Yuichi Inoue, Kawasaki (JP); Kazuaki Tarumi, Darmstadt (DE); Matthias Bremer, Darmstadt (DE); Melanie Klasen-Memmer, Darmstadt (DE); Simon Greenfield, Wimborne (GB); Richard Harding, Southampton (GB)

(73) Assignees: Sharp Kabushiki Kaisha, Osaka (JP); Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/966,692

(22) Filed: Oct. 15, 2004

(65) Prior Publication Data

US 2005/0116200 A1 Jun. 2, 2005

Related U.S. Application Data

(63) Continuation of application No. PCT/JP03/04791, filed on Apr. 15, 2003.

(30) Foreign Application Priority Data

Apr. 16, 2002 (JP) ............................. 2002-113972

(51) Int. Cl.
C09K 19/38 (2006.01)
C09K 19/52 (2006.01)
C09K 19/12 (2006.01)
C09K 19/20 (2006.01)
C09K 19/32 (2006.01)

(52) U.S. Cl. .................... 428/1.3; 428/1.1; 252/299.01; 252/299.62; 252/299.66; 252/299.67; 349/183

(58) Field of Classification Search ........... 252/299.01, 252/299.67, 299.62, 299.66; 428/1.1, 1.3; 349/183

See application file for complete search history.

(56) References Cited

U.S. PATENT DOCUMENTS 5,730,899 A * 3/1998 Ohnishi et al. ........ 252/299.01
6,180,028 B1 * 1/2001 Hotaka et al. ......... 252/299.66
6,778,229 B2 * 8/2004 Inoue et al. ................... 349/39
6,894,741 B2 * 5/2005 Nakanishi et al. ............ 349/93
2003/0067579 A1 * 4/2003 Inoue et al. ................. 349/187

FOREIGN PATENT DOCUMENTS

| JP | 10-036847 | | 2/1998 |
|---|---|---|---|
| JP | 10036847 | | 2/1998 |
| JP | 10-239672 | * | 9/1998 |
| JP | 11-212121 | | 8/1999 |
| JP | 11-217342 | | 8/1999 |
| JP | 11212121 | | 8/1999 |
| JP | 11217342 | | 8/1999 |
| WO | WO 93/23496 | | 11/1993 |
| WO | WO 98/49253 | | 11/1998 |
| WO | WO 99/00464 | | 1/1999 |

OTHER PUBLICATIONS

English abstract for JP 10-239672.*
English abstract for JP 2001-281664.*
Copy of Office Action from Taiwan Patent Office (and English translation), 2005, pp. 1-2.

* cited by examiner

Primary Examiner—Shean C. Wu
(74) Attorney, Agent, or Firm—Greer, Burns & Crain, Ltd.

(57) ABSTRACT

A liquid crystal display device produced through the steps of injecting a polymerizable monomer-containing liquid crystal composition between two substrates and, while applying a voltage between opposing transparent electrodes of the substrates, polymerizing the monomer, wherein the polymerizable monomer contained in the liquid crystal composition has one or more ring or condensed ring structures and functional groups bonded directly to the ring or condensed ring structure.

The monomer is preferably represented by the following general formula:

$$P^1\text{-}A^1\text{-}(Z^1\text{-}A^2)_n\text{-}P^2$$

wherein $P^1$ and $P^2$ are acrylates or the like, $A^1$ and $A^2$ are 1,4-phenylenes or the like, $Z^1$ is —COO— or the like, and n is 0 to 2.

10 Claims, 2 Drawing Sheets

LIQUID CRYSTAL DISPLAY DEVICE

CROSS-REFERENCES TO RELATED APPLICATIONS

This application is based upon and claims the benefit of priority from prior Japanese Patent Application No. 2002-113972, filed on Apr. 16, 2002, the entire contents thereof being incorporated herein by reference, and a continuation of PCT/JP03/04791 filed on Apr. 15, 2003.

TECHNICAL FIELD

The present invention relates to a liquid crystal display device using a liquid crystal orientation, the direction of which is determined by filling a liquid crystal material containing a photo- or heat-polymerizable monomer, oligomer or the like into between substrates, and polymerizing the polymerizable component while adjusting the voltage applied to the liquid crystal layer, and relates to such a liquid crystal material. The voltage applied includes 0 volts and hereinafter, the voltage adjustment should be understood to include 0 volts.

BACKGROUND ART

Active matrix-type liquid crystal display devices have heretofore usually used a TN (twisted nematic) mode, but the TN mode is disadvantageously narrow in viewing angle characteristics. Therefore, other techniques, such as the MVA (multidomain vertical alignment) mode and the IPS (in-plane-switching) mode, are employed for wide-viewing-angle liquid crystal panels.

In the IPS mode, a pair of flat comb-shaped electrodes opposing to each other are provided in a horizontal plane parallel to the display plane direction, and the liquid crystal molecules between opposing electrodes are switched in the horizontal plane. The flat comb-shaped electrodes extremely decrease the aperture ratio of the liquid crystal display device and therefore, a strong backlight is necessary for the IPS-mode liquid crystal display device.

In the MVA mode, the liquid crystal is oriented vertically to the substrate, and the alignment of liquid crystal molecules is defined by slits provided in a transparent electrode (ITO film) and protrusions provided on the opposing substrate. In the MVA-mode liquid crystal display, although a reduction of the substantial aperture ratio due to slits or protrusions is not so large as in the IPS-mode liquid crystal display device using comb-shaped electrodes, the light transmission of the MVA-mode liquid crystal display device is low compared with the TN-mode liquid crystal display device. Therefore, the MVA-mode liquid crystal display device cannot be employed for laptops requiring low power consumption.

In recent MVA-mode liquid crystal display devices, banks (protrusions) and ITO slits are complicatedly arranged so that liquid crystal molecules turn over in four directions upon application of a voltage to attain wide viewing angle and, therefore, the light transmission is decreased. If this arrangement is simplified and the distance between banks or between slits is expanded, the light transmission can be increased. However, if the distance between banks or ITO slits is significantly large, the propagation of liquid crystal molecule tilting takes much time and when a voltage is applied to the device for display, the response of the device is seriously delayed.

In order to solve this problem of delayed response, in the production of an MVA-mode liquid crystal display device, a technique of injecting a polymerizable monomer-containing liquid crystal material between substrates and polymerizing the monomer in the state of a voltage being applied, thereby memorizing the direction to which liquid crystal molecules turn over, has been introduced.

In general, a liquid crystal display device more or less causes a phenomenon of image burn such that, after the same image is continuously displayed for a long period of time, the previous image is persistently viewed, even if the display image is changed. The generation of this image burn phenomenon is an unavoidable problem also in the liquid crystal display device produced by using the above-described technique of injecting a polymerizable monomer-containing liquid crystal material between substrates and polymerizing the monomer in the state of a voltage being applied, thereby memorizing the direction to which liquid crystal molecules turn over. In fact, a technique capable of reducing this phenomenon without fail has, heretofore, not been known.

DISCLOSURE OF THE INVENTION

An object of the present invention is to provide a liquid crystal display device, particularly an MVA-mode liquid crystal display device, effectively reduced in image burn.

The liquid crystal display device provided in the present invention is a liquid crystal display device having two substrates each equipped with a transparent electrode and an alignment control film for aligning liquid crystal molecules, and comprising liquid crystal composition between the substrates, the device being produced through the steps of injecting a polymerizable monomer-containing liquid crystal composition between the two substrates and while applying a voltage between the opposing transparent electrodes of the substrates, and polymerizing the monomer, wherein the polymerizable monomer contained in the liquid crystal composition has one or more ring or condensed ring structures and two functional groups bonded directly to the ring or condensed ring structure.

BEST MODE FOR CARRYING OUT THE INVENTION

Figure 1:
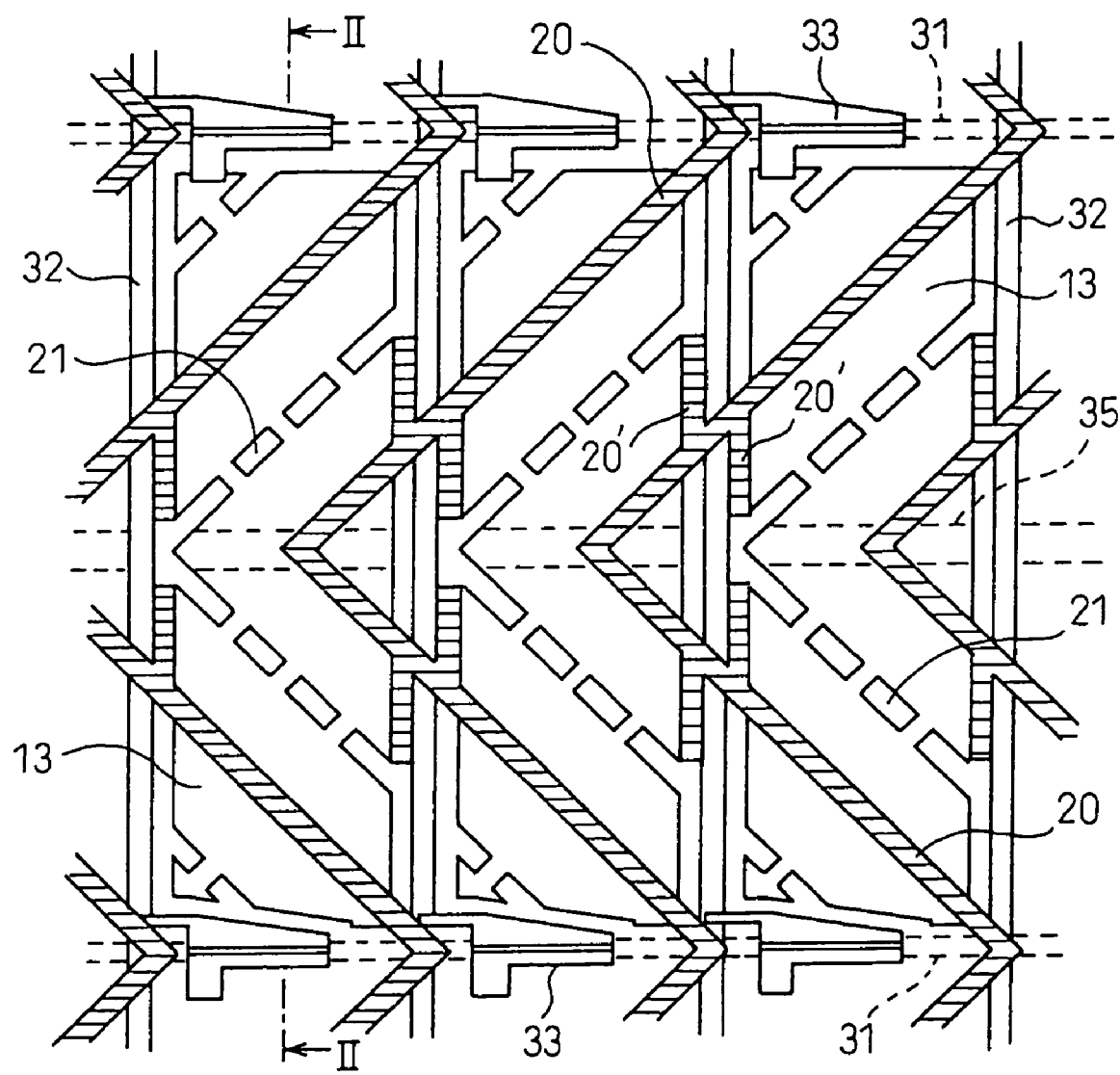
FIG. 1 is a schematic plan view illustrating liquid crystal display devices produced in Comparative Examples and Examples.

In the present invention, a specific monomer compound is used at the stage of producing a liquid crystal display device so as to regulate the direction to which liquid crystal molecules turn over, whereby the liquid crystal display device improved in response delay at the application of a voltage by memorizing the turn-over direction of liquid crystal molecules enclosed between substrates is greatly reduced in a so-called image-burn phenomenon.

More specifically, as a result of intensive investigations on various monomer compounds and liquid crystal compositions used in a liquid crystal display device so as to solve the problem of image burn, the present inventors have obtained the following knowledge. The present invention has been accomplished based on this knowledge.

The smaller the molecular weight of the monomer contained in the liquid crystal composition, the more image burn is reduced.

When the monomer contained in the liquid crystal composition has a ring or condensed ring structure and a functional group is bonded directly to the ring structure, the image burn is reduced.

The image burn is more reduced when using a condensed-ring monomer with two ring structures than when using a monomer having one ring structure, and more reduced when using a monomer having non-condensed two ring structures than when using a condensed-ring monomer with two ring structures.

In the present invention, a monomer compound having a ring or condensed ring structure must be used, in order for the direction of a normal liquid crystal molecule not having a functional group to correspond with the molecular direction of the monomer. If a monomer having condensed two-ring structures rather than a monomer having one ring is used, or if a monomer having non-condensed two-ring structures rather than a monomer having condensed two ring structures, the ability of aligning normal liquid crystal molecules is higher, and the ratio of the functional group moiety occupying in the molecule relatively decreases, with the result that the molecule itself becomes rigid. On the other hand, if the monomer contains a bendable site such as an alkylene group or polymethylene group between the ring structure and the functional group, when the monomer is polymerized and then a voltage is applied to the liquid crystal display device, the polymer is also deformed together with the liquid crystal molecule, which give rise to image burn.

The monomer compound for use in the present invention is preferably selected from those represented by the following general formula (1):

$$P^1-A^1-(Z^1-A^2)_n-P^2 \quad (1)$$

wherein $P^1$ and $P^2$ are functional groups and are independently selected from acrylate, methacrylate, vinyl, vinyloxy and epoxy groups, $A^1$ and $A^2$ are ring structures and independently selected from 1,4-phenylene and naphthalene-2,6-diyl groups, $Z^1$ represents a —COO— or a —OCO— group, or a single bond, and n is 0, 1 or 2.

In formula (1), $P^1$ and $P^2$ are preferably acrylate groups, $Z^1$ is preferably a single bond, and n is preferably 0 or 1. The monomer for use in the present invention is more preferably a compound represented by any one of the following formulae:

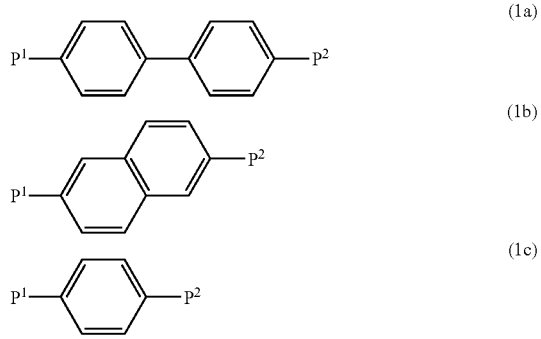

wherein $P^1$ and $P^2$ are as defined above in formula (1), particularly preferred being acrylate group.

Among these compounds, the compounds of formulae (1a) and (1b) are preferred, and the compound of formula (1a) is particularly preferred.

EXAMPLES

The present invention is described in detail below by referring to Examples but the present invention is not limited to these Examples.

In the following Examples, a vertical alignment film was used in the liquid crystal display device. Also, a liquid crystal having a negative dielectric anisotropy was used and the director of liquid crystal molecules was set to be in the direction almost perpendicular to the substrate when a voltage was not applied. The polarizing plates were laminated on both sides of the liquid crystal display in the cross-nicol arrangement to give a normally black mode and the polarization axis of the polarizing plate was in parallel to the bus line. The panel size was 15 inches and the resolution was XGA.

Figure 2:
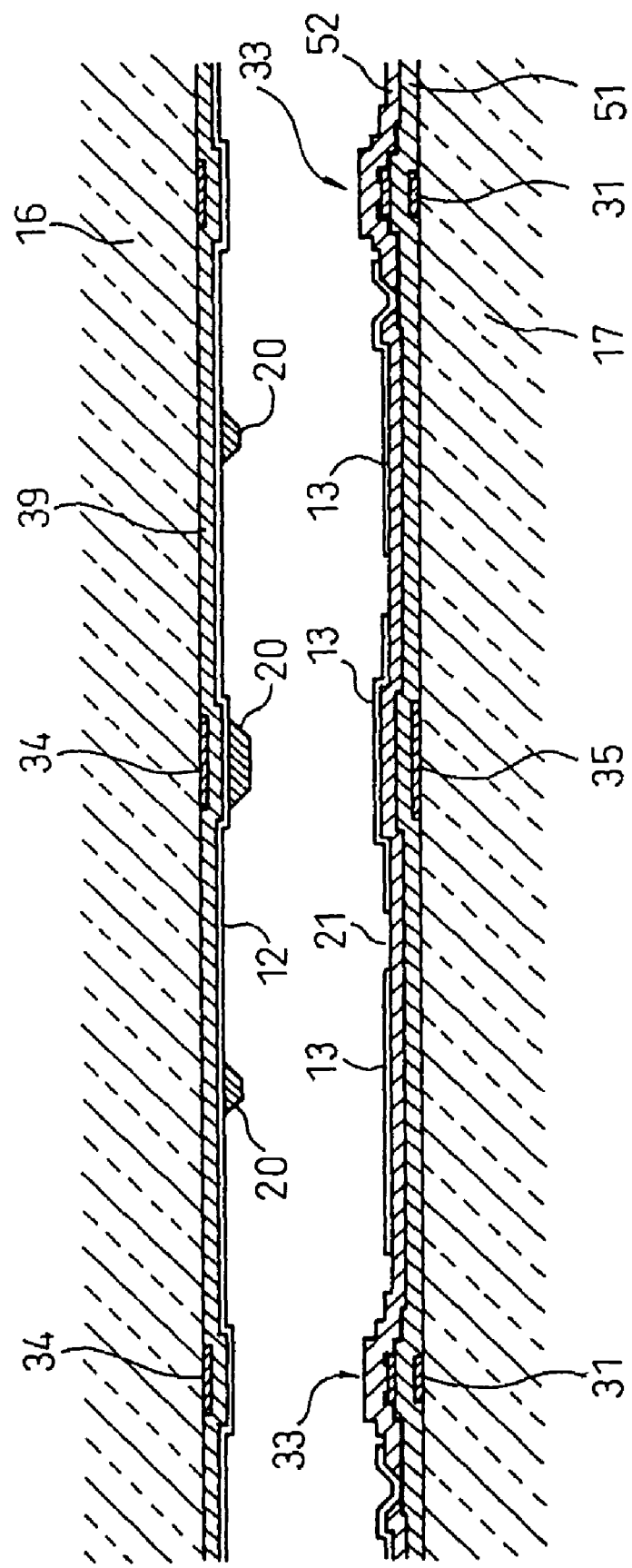
FIG. 2 is a cross-sectional view cut along the II—II line of FIG. 1.

FIG. 1 shows a schematic plan view illustrating the liquid display device produced, and FIG. 2 shows a cross-sectional view cut along the II—II line of FIG. 1. A black matrix 34 for shading and a color separation filter (color filter) 39 are formed on one glass substrate 16, and an ITO common electrode is formed on the entire surface of the color separation filter 39. In addition, protrusions 20 are further formed zigzag on the glass substrate 16, and auxiliary protrusions 20' are also formed. On the other glass substrate 17, a plurality of parallel gate bus lines 31, a plurality of parallel data bus lines 32 formed in the direction perpendicular to the gate bus lines 31, thin-film transistors (TFTs) 33 formed like a matrix in correspondence to the intersection of the gate bus line 31 and the data bus line 32, and ITO display pixel electrodes 13 are provided. The gate bus line 31 is separated from the data bus line 32 by an insulating film 51, and source/drain electrodes of TFT 33 are formed in the same layer as the data bus line 32. An insulating film 52 is formed on the data bus line 32, and a pixel electrode 13 is further formed thereon. In the pixel electrode 13, as shown in the plan view of FIG. 1, slits 21 are provided in parallel to protrusions 20 and at the middle position of adjacent protrusions 20. A Cs electrode 35 for auxiliary capacitance is provided at the middle position of adjacent gate bus lines 31 to run in parallel to the gate bus lines 31 so as to stabilize the potential of each pixel electrode 13. As seen in FIG. 2, two glass substrates 16 and 17 are combined to oppose the common electrode 13 to the pixel electrodes 13, and a liquid crystal composition (not shown) is held therebetween. An alignment control film is formed on the surfaces of common electrode 12 and pixel electrodes 13, but for the sake of simplicity, these are not shown in FIG. 2. Similarly, for the sake of simplicity, a polarizing plate laminated on each outer surface side of glass substrates 16 and 17 is not shown in FIG. 2.

In the Examples below, the image burn ratio was determined as follows.

A black-and-white checker pattern was displayed in the display region for 48 hours. Thereafter, a predetermined half tone (gray) was displayed in the entire display region, and the difference (β−γ) between the brightness β in the region previously displayed white and the brightness in the region previously displayed black was divided by the brightness γ in the region previously displayed black to determine the image burn percentage. That is, the image burn percentage α was calculated according to the following equation:

Image burn percentage $\alpha=((\beta-\gamma)/\gamma)\times 100$ (%)

Comparative Example 1

A liquid crystal composition having added thereto 0.3 wt % of a diacrylate having a trimethylene chain between the ring structure and the functional group and having a relatively large molecular weight, represented by the following formula:

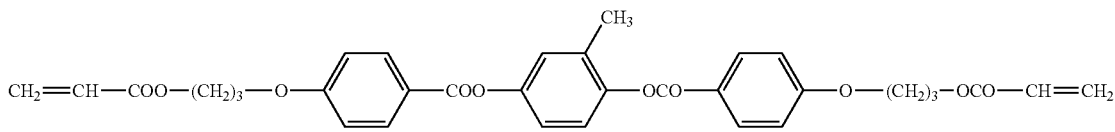

was injected between opposing substrates of the liquid crystal display device and then, ultraviolet light was irradiated at 4 J/cm$^2$ and at room temperature while applying a voltage of 10 V. The 48-hour image burn percentage of this liquid crystal display device was 25%.

Comparative Example 2

A liquid crystal composition having added thereto 0.3 wt % of a diacrylate having a hexamethylene chain between the ring structure and the functional group, represented by the following formula:

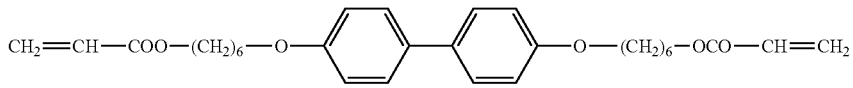

was injected between opposing substrates of the liquid crystal display device and then, ultraviolet light was irradiated at 4 J/cm$^2$ and at room temperature while applying a voltage of 10 V. The 48-hour image burn percentage of this liquid crystal display device was 26%.

Example 1

A liquid crystal composition having added thereto 0.3 wt % of a diacrylate having functional groups bonded directly to the ring structure, represented by the following formula:

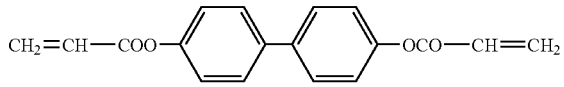

was injected between opposing substrates of the liquid crystal display device and then, ultraviolet light was irradiated at 4 J/cm$^2$ and at room temperature while applying a voltage of 10 V. The 48-hour image burn percentage of this liquid crystal display device was 6%.

INDUSTRIAL APPLICABILITY

According to the present invention, a liquid crystal display device greatly reduced in the image burn percentage can be provided.

The invention claimed is:

1. A liquid crystal display device having two substrates each equipped with a transparent electrode and an alignment control film for aligning liquid crystal molecules, and comprising a liquid crystal composition between the substrates, the device being produced through the steps of injecting a polymerizable monomer-containing liquid crystal composition between the two substrates and while applying a voltage between the opposing transparent electrodes of the substrates, polymerizing said monomer, wherein the polymerizable monomer contained in said liquid crystal composition has one or more ring or condensed ring structures and two functional groups bonded directly to said ring or condensed ring structure;

wherein the liquid crystal device further comprises two polarizing plates laminated on both sides of the liquid crystal display;

wherein the polymerizablemonomer-containing liquid crystal composition includes both the polymerizable monomer and the liquid crystal molecules.

2. The liquid crystal display device as claimed in claim 1, wherein said monomer is represented by the following general formula:

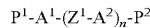

wherein P$^1$ and P$^2$ are independently selected from groups consisting of acrylate, methacrylate, vinyl, vinyloxy or epoxy groups, A$^1$ and A$^2$ are independently selected from groups consisting of 1,4-phenylene and naphthalene-2,6-diyl groups, Z$^1$ represents a —COO— or a —OCO— group, or a single bond, and n is 0, 1 or 2.

3. The liquid crystal display device as claimed in claim 2, wherein P$^1$ and P$^2$ are acrylate groups, Z$^1$ is a single bond, and n is 0 or 1.

4. The liquid crystal display device as claimed in claim 2, wherein said monomer is represented by the following formula:

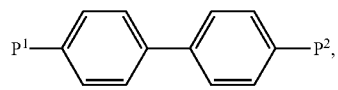

-continued

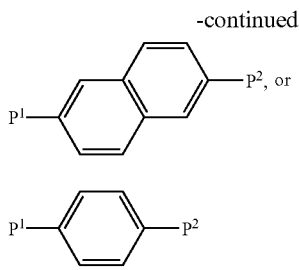

wherein P¹ and P² are functional groups independently selected from groups consisting of acrylate, methacrylate, vinyl, vinyloxy or epoxy groups.

5. The liquid crystal display device as claimed in claim 2, wherein said monomer is represented by the following formula:

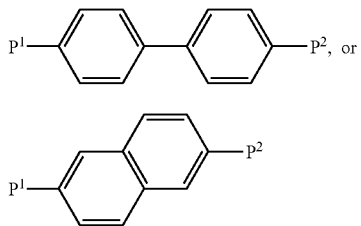

wherein P¹ and P² are functional groups independently selected from groups consisting of acrylate, methacrylate, vinyl, vinyloxy or epoxy groups.

6. The liquid crystal display device as claimed in claim 2, wherein said monomer is represented by the following formula:

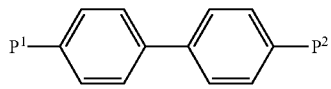

wherein P¹ and P² are functional groups independently selected from groups consisting of acrylate, methacrylate, vinyl, vinyloxy or epoxy groups.

7. The liquid crystal display device as claimed in anyone of claims 4 to 6, wherein P¹ and P² are acrylate groups.

8. The liquid crystal display device as claimed in claim 1, wherein said monomer is represented by the following formula:

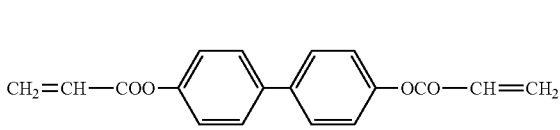

9. The liquid crystal display device as claimed in anyone of claims 1 to 6, wherein said liquid crystal composition has a negative dielectric anisotropy.

10. The liquid crystal display device as claimed in any one of claims 1 to 6, wherein the direction of the liquid crystal molecules is a direction almost perpendicular to the substrate when a voltage is not applied.

* * * * *

UNITED STATES PATENT AND TRADEMARK OFFICE
CERTIFICATE OF CORRECTION

PATENT NO. : 7,169,449 B2 Page 1 of 1
APPLICATION NO. : 10/966692
DATED : January 30, 2007
INVENTOR(S) : Nakanishi et al.

It is certified that error appears in the above-identified patent and that said Letters Patent is hereby corrected as shown below:

In the Claims:

Col. 6, line 40, delete "polymerizablemonomer" and insert -- polymerizable monomer --.

Col. 6, line 54, delete "naphthalene-2,6-diyl" and insert -- naphthalene-2, 6-diyl --.

Signed and Sealed this

Twelfth Day of June, 2007

JON W. DUDAS
*Director of the United States Patent and Trademark Office*